US007203307B1

(12) United States Patent
Suehiro (10) Patent No.: US 7,203,307 B1
(45) Date of Patent: Apr. 10, 2007

(54) METHOD AND APPARATUS FOR AUTOMATICALLY INITIATING A TELEPHONE COMMUNICATION

(75) Inventor: Yasuo Suehiro, Dallas, TX (US)

(73) Assignee: Uniden America Corporation, Ft. Worth, TX (US)

( * ) Notice: Subject to any disclaimer, the term of this patent is extended or adjusted under 35 U.S.C. 154(b) by 0 days.

(21) Appl. No.: 11/128,627

(22) Filed: May 13, 2005

(51) Int. Cl.
*H04M 1/00* (2006.01)

(52) U.S. Cl. .................. 379/355.01; 379/355.03; 379/90.01

(58) Field of Classification Search .......... 379/406.01, 379/406.05, 406.06, 406.08, 406.11
See application file for complete search history.

(56) References Cited

U.S. PATENT DOCUMENTS 6,950,652 B2 * 9/2005 Janssen et al. ......... 379/355.02
7,035,393 B1 * 4/2006 Silver et al. ........... 379/355.03
2002/0159574 A1 * 10/2002 Stogel ..................... 379/93.01

* cited by examiner

*Primary Examiner*—Jefferey F. Harold
(74) *Attorney, Agent, or Firm*—Lawrence R. Youst; Kenneth T. Emanuelson; Danamraj & Youst, P.C.

(57) ABSTRACT

A system (100) for automatically redialing a telephone number includes a first telephone component (104, 106, 108, 132) operable to initiate a call to the telephone number and operable to transmit the telephone number and a second telephone component (104, 106, 108, 132, 302) operable to initiate telephone calls and operable to receive the telephone number transmitted by the first telephone component (104, 106, 108, 132, 302). A memory unit (162, 182, 306, 312), disposed within the second telephone component (104, 106, 108, 132, 302), is operable to store the telephone number transmitted by the first telephone component (104, 106, 108, 132, 302). A redial module, disposed within the second telephone component (104, 106, 108, 132, 302), is operable to retrieve the telephone number from the memory unit (162, 182, 306, 312) and operable to automatically initiate a call to the retrieved telephone number.

15 Claims, 6 Drawing Sheets

METHOD AND APPARATUS FOR AUTOMATICALLY INITIATING A TELEPHONE COMMUNICATION

TECHNICAL FIELD OF THE INVENTION

The present invention relates, in general, to automatic telephone call initiation and, more specifically, to a telephone system operable to share outgoing call data among its separate components and to redial a previously called number using one of a set of components.

BACKGROUND OF THE INVENTION

Despite the increasing use of cellular telephone equipment, the traditional publicly-switched telephone network, or "PSTN", continues to carry the bulk of local telephone communications in the United States. PSTN service is normally provided to the customers of a local exchange carrier, or "LEC" and is delivered over a PSTN telephone line to the customer's premises, referred to as the "local loop".

Incoming call handshaking begins with a ring signal sent to customer premises over the PSTN local loop. In the United States, the ring signal is generally a 90-volt alternating current signal transmitted at 20 hertz, transmitted in a two second pulse every six seconds. Caller identification data, if available, is generally sent over the PSTN local loop between the first and second ring signal using a frequency-shift keying technique at 1,200 bits per second (1,200 baud). PSTN caller identification data generally includes the telephone number originating the call and a time and date stamp reflecting the current time. The data also commonly includes an ascii string of alphanumeric characters providing additional information regarding the call source.

A caller identification decoder attached to the PSTN local loop, which may be incorporated into a telephone or may be a separate unit, can decode the caller identification signal and provide the customer with information regarding the source of the incoming call. Generally, the decoder will incorporate some degree of memory for storage of caller identification information related to prior incoming calls in an incoming call log. Accordingly, a customer who has been away from the phone for some time can review the incoming call log and determine what phone numbers called that number and at what time. Certain telephone systems incorporate the capability to initiate a call to numbers stored in the incoming call log.

In addition to storing incoming call data in an incoming call log, certain telephone systems also store outgoing call data in an outgoing call log. Certain telephone systems incorporate the capability to redial numbers stored in the outgoing call log. These systems often incorporate a traditional redial function, which will automatically redial the number of the immediate prior outgoing call.

SUMMARY OF THE INVENTION

According to one aspect, the present invention is directed to a system for automatically redialing a previously called telephone number from any one of a set of separate telephone components. The system includes a first telephone component incorporating a transceiver operable to initiate a call to the selected telephone number and operable to transmit the telephone number via a link. The system also includes a second telephone component incorporating a transceiver operable to initiate telephone calls and operable to receive the telephone number transmitted by the first telephone component via the link. A memory unit, disposed within the second telephone component, is operable to store the telephone number transmitted by the first telephone component via the link. Finally, a redial module, disposed within the second telephone component, is operable to retrieve the telephone number from the memory unit and operable to automatically initiate a call to the retrieved telephone number.

In certain embodiments, the first and second telephone components are cordless telephone handsets. In other embodiments, the first telephone component is a cordless telephone handset and the second telephone component is a cordless telephone base unit. In further embodiments, the first telephone component may be a cordless telephone base unit while the second telephone component is a cordless telephone handset. In certain embodiments, the link may be a direct cordless link between the first and second telephone components, for example, between a cordless telephone handset and a cordless telephone base unit. In other embodiments, the link may be an indirect cordless link between the first and second telephone components, such as between first and second telephone handsets via a cordless telephone base unit. In certain embodiments, more than one outgoing telephone number may be stored within the second telephone component.

According to another aspect, the present invention is directed to a method of automatically redialing a telephone number. The method comprises the steps of initiating a call to the telephone number using a first telephone component, communicating the telephone number from the first telephone component to a second telephone component via a link, storing the telephone number within the second telephone component, retrieving the telephone number using the second telephone component and automatically initiating a call to the retrieved telephone number using the second telephone component.

In a further aspect, the present invention is directed to an apparatus for automatically redialing a telephone number. The apparatus comprises a means for initiating a call to the telephone number using a telephone component, a means for communicating the telephone number from the telephone component to a second telephone component via a link and a means for storing the telephone number within the second telephone component. The apparatus further comprises a means for retrieving the telephone number using the second telephone component and a means for automatically initiating a call to the retrieved telephone number using the second telephone component.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE DRAWINGS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

The present invention provides for a system, method and apparatus for generating an common outgoing call log within each of the separate components of a telephone system. The outgoing call log within each component includes the numbers recently called from any component in the system. Within a system incorporating two components, the outgoing call log within the first component will not only incorporate the numbers called from the first component, but also incorporate the numbers called from the second component, and vice versa. Accordingly, a user can automatically redial a number previously called from the first component using the second component, or vice versa. The present invention is described below in connection with a cordless telephone system operable to place outgoing calls over a PSTN local loop for purposes of illustration, but those of skill in the art will appreciate that the teachings of the present invention may be employed in other contexts.

Figure 1:
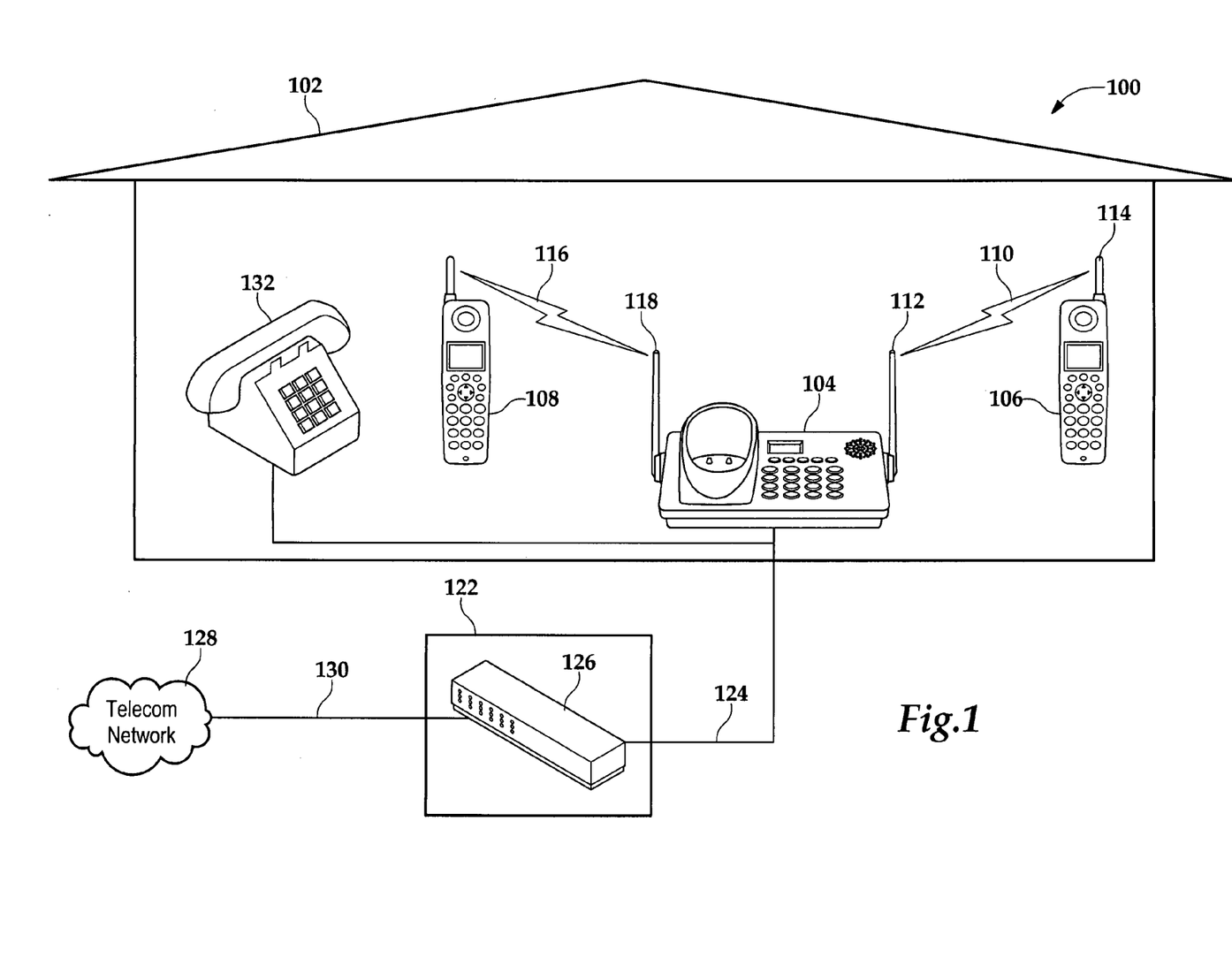
FIG. 1 is an architectural layout of a telephone system incorporating a cordless telephone base unit and a pair of cordless handsets according to certain embodiments of the present invention.

Turning now to FIG. 1, this figure depicts a telephone system 100 disposed within a residence 102. The telephone system 100 incorporates a cordless telephone base unit 104, a cordless handset 106 and a cordless handset 108. A cordless link 110 connects base unit antenna 112 to cordless handset antenna 114. A cordless link 116 connects base unit antenna 118 to cordless handset antenna 120. The cordless telephone base unit 104 is connected to the telephone company remote office 122 via PSTN local loop 124 connecting cordless telephone base unit 104 to PSTN switch 126. The telephone company remote office 122 connects cordless telephone base unit 104 to a wider telecom network 128 via telecom link 130.

In addition to cordless telephone base unit 104, telephone system 102 also includes a wired telephone 132. Cordless telephone base unit 104 enables a user to communicate to the telecom network 128 using one of cordless handset 106 and cordless handset 108. Wired telephone 132 provides similar functionality, except that the telephone handset is physically attached to the telephone base. The telephone system 100 of residence 102 may, of course, include other equipment (not shown) useful for communication over wider telecom network 128, including but not limited to fax machines, answering machines, computer modems and the like (not shown).

Generally, a call coming in over PSTN local loop 124 will ring wired telephone 132 and both cordless handsets 106, 108, and any of wired telephone 132 or cordless handsets 106, 108 can answer the call. In certain embodiments, cordless telephone base unit 104 may also ring and may be answered in speaker mode. Similarly, an outgoing call to be placed over PSTN local loop 124 can originate from wired telephone 132 or either cordless handset 106, 108 and may be originated from cordless telephone base unit 104 in certain embodiments.

Wired telephone 132 and cordless handsets 106, 108 act as the primary user interfaces for system 100. Cordless handsets 106, 108 are shown as being remote from base unit 104, but either cordless handset may be cradled within base unit 104 at a given time. Cordless links 110, 116 carry incoming and outgoing voice signals between base unit 104 and cordless handsets 106, 108 and will generally also transmit dial codes and other data between base unit 104 and cordless handsets 106, 108.

PSTN local loop 124 is generally a physical electrical connection incorporating a copper wire pair. In certain embodiments, all or a portion of PSTN local loop 124 could involve RF or optical signal transmission components, or could represent one discrete signal among others on a common line. In certain embodiments, residence 102 may have multiple incoming PSTN lines, in which case there may be additional connections (not shown) between PSTN remote office 122 and base unit 104. Any and all of these variations are encompassed within the spirit and scope of the present invention.

When a call is made to the telephone number assigned to PSTN local loop 124, PSTN remote office 122 will transmit a ring signal indicating an incoming telephone call over PSTN local loop 124, which will be received by wired telephone 132, base unit 104 and any other device connected to PSTN local loop 124. Subsequent to transmission of the first ring signal, PSTN remote office 122 will transmit caller identification data for the incoming call over PSTN local loop 124. This data will include, at a minimum, the telephone number from which the call originated and the date and time of the call origination.

Upon receipt and decoding of incoming caller identification data by wired telephone 132 and base unit 104, a portion of the data may be stored in within base unit 104, and all or a part of the data may be transmitted on to cordless handsets 106, 108 via cordless links 110, 116. Where system 100 includes multiple incoming PSTN lines, the base unit 104 may also identify to cordless handsets 106, 108 the PSTN line over which the incoming call is being received. Cordless handsets 106, 108 and base unit 104 may communicate this data to a user by a variety of methods, including distinct ringtones, distinct images, distinct messages, or a combination of one or more of the above.

When a user wishes to make an outgoing call over PSTN local loop 124, the call can be originated from wired telephone 132, base unit 104, cordless handset 106 or cordless handset 108. It is, of course, necessary for the user to indicate the destination to which the outgoing call is to be placed. This can be done according to a number of methods. According to a first method, the user can key in a telephone number at wired telephone 132, base unit 104, cordless handset 106 or cordless handset 108. This may be done either before or after the wired telephone 132 or base unit 104 sends an "off hook" message over PSTN local loop 124. According to the present invention, system 100 also incorporates a redial function, which redials the number of a prior outgoing call at the user's request. Alternately, a number may be selected from another set of numbers stored in memory on-board the cordless handsets 106, 108 and/or the base unit 104. These numbers may include numbers stored in an incoming call log or an address book, as examples.

Figure 2:
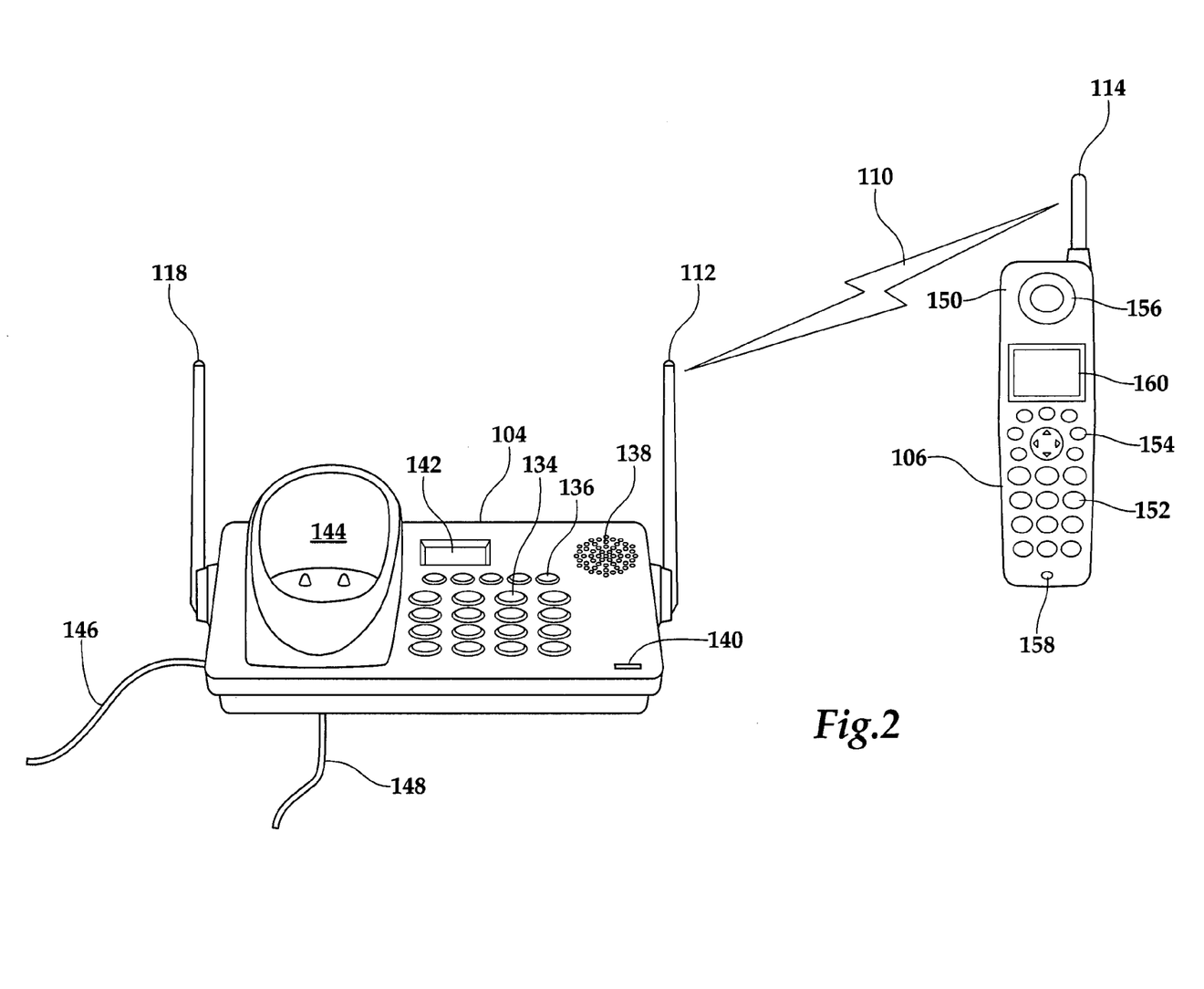
FIG. 2 is a detail view of a base unit and a cordless handset according to certain embodiments of the present invention.
Figure 3:
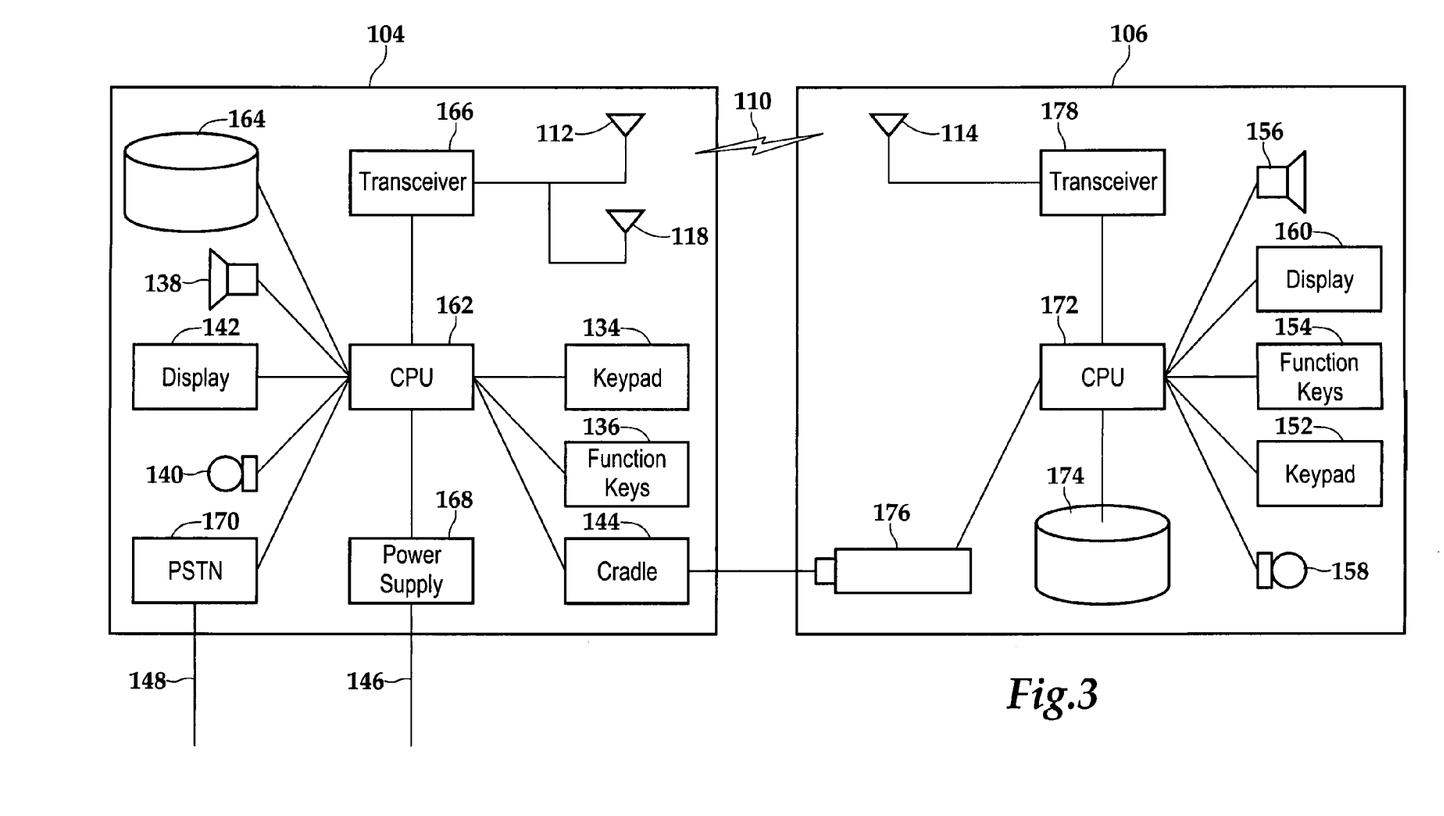
FIG. 3 is a functional block diagram depicting the base unit and cordless handset of FIG. 2.

Referring next to FIGS. 2 and 3, therein is depicted a detail view and a functional block diagram, respectively, of base unit 104 and cordless telephone handset 106. As seen in FIGS. 2 and 3, cordless telephone base unit 104 incorporates a base unit numeric keypad 134, base unit function keys 136, a base unit speaker 138, a base unit microphone 140, a base unit display 142 and a base unit handset cradle 144. A base unit power cord 146 provides electrical power to base unit 104, while base unit PSTN connection 148 provides a communication link to PSTN local loop 124.

Base unit numeric keypad 134 and base unit function keys 136 provide interface capability between base unit 104 and a user, including the capability to initiate a call to outgoing telephone numbers and to access various functions of base unit 104, including automatic redial functions. Base unit microphone 140 and base unit speaker 138 provide base unit 104 with the capability to make and answer telephone calls in a speakerphone mode.

Base unit 104 incorporates certain internal components, some of which are depicted in FIG. 3. These components include a central processing unit 162 operably connected to the other functional components of base unit 104, a base unit memory 164, a base unit transceiver 166, a base unit power supply 168 and a base unit PSTN interface 170. Base unit memory 164 is operable to store information important to the operation of base unit 104 and its operations, which may include an incoming call log and an outgoing call log. In certain embodiments, the base unit 104 retains the last number dialed through base unit 104 in order to facilitate an automatic redial function from the base unit 104 at the request of the user via one of the function keys 136.

Base unit transceiver 166 serves as the interface between base unit CPU 162 and base unit antennas 112 and 118, which in turn serve as the interfaces between base unit 104 and cordless handsets 106, 108. Base unit transceiver 166 communicates voice and tone or pulse data between the cordless handsets 106, 108 and PSTN local loop 124 as well as internal data communications between base unit 104 and cordless handsets 106, 108.

Base unit power supply 168 converts alternating current power from base unit power cord 146 into direct current power suitable for use by the internal electronics of base unit 104. Base unit power supply 168 also regulates power to the base unit handset cradle 144.

In the embodiment shown in FIGS. 2 and 3, the capability to communicate directly with the PSTN remote office 122, represented by PSTN interface 170, is built in to base unit 104. This capability can be included in base unit 104 owing to the simplicity and low cost of the necessary components of PSTN interface 170 and the wide standardization inherent to publicly-switched telephone networks. In addition to having the capability to receive incoming calls through one or more "land lines" such as PSTN local loop 124, base unit 104 may also be operable to receive incoming calls through one or more cellular networks via a cellular interface (not shown). Base unit 104 may incorporate additional functional components as a particular application dictates, such as one or more system clocks, user input components or one or more additional display modules, as examples.

Cordless handset 106 incorporates a cordless handset body 150, a cordless handset numeric keypad 152, cordless handset function keys 154, a cordless handset speaker 156, a cordless handset microphone 158 and a cordless handset display 160. Cordless handset numeric keypad 152 provides the user with a means of entering outgoing telephone numbers. Cordless handset function keys 154 provide the user with means to access the various functions of cordless handset 106, including automatic redial. Cordless handset speaker 156 converts electrical signals within cordless handset 106 into audible sound signals, while cordless handset microphone 158 converts received sound signals into electrical signals. Cordless handset display 160 provides a means to communicate information contained within cordless handset 106 to the user. Such information may include, for example, incoming caller identification information, current outgoing call information, prior outgoing call information and call log information, as examples.

Cordless handset 106 includes a set of internal components, as shown in FIG. 3. These components include cordless handset CPU 172, cordless handset memory 174, cordless handset battery 176 and cordless handset transceiver 178. Similar to base unit CPU 162, cordless handset CPU 172 is operably connected to, and coordinates the operation of, the other components of cordless handset 106. The remaining internal components of cordless handset 106 have functions similar to the similarly-named components of base unit 104.

Similar to base unit memory 164, cordless handset memory 174 is operable to store information important to the operation of cordless 106 and its functions, which may include an incoming call log, an outgoing call log and/or address book. In certain embodiments, cordless handset memory 174 retains at least the last number dialed through cordless handset 106 in order to facilitate an automatic redial function from cordless handset 106 at the request of the user. In certain embodiments, cordless handset memory 174 retains the last number dialed through any component of system 100, including base unit 104, cordless handset 106 or cordless handset 108.

Cordless handset battery 176 stores electrical power for use by cordless handset 106 when it is away from base unit handset cradle 144. Cordless handset battery 176 may be of any of a number of rechargeable battery types, including lithium ion, nickel metal hydride and nickel cadmium, as examples. First unit cordless handset battery 176 may be a single-cell battery or may include multiple cells, as dictated by the particular application.

Cordless handset transceiver 178 serves as the interface between cordless handset CPU 172 and cordless handset antennas 114, which in turn serves as the interface between cordless handset 106 and base unit 104. Cordless handset transceiver 178 communicates voice and tone or pulse data between the cordless handset 106 and PSTN local loop 124 as well as internal data communications between base unit 104 and cordless handset 106.

Figure 4:
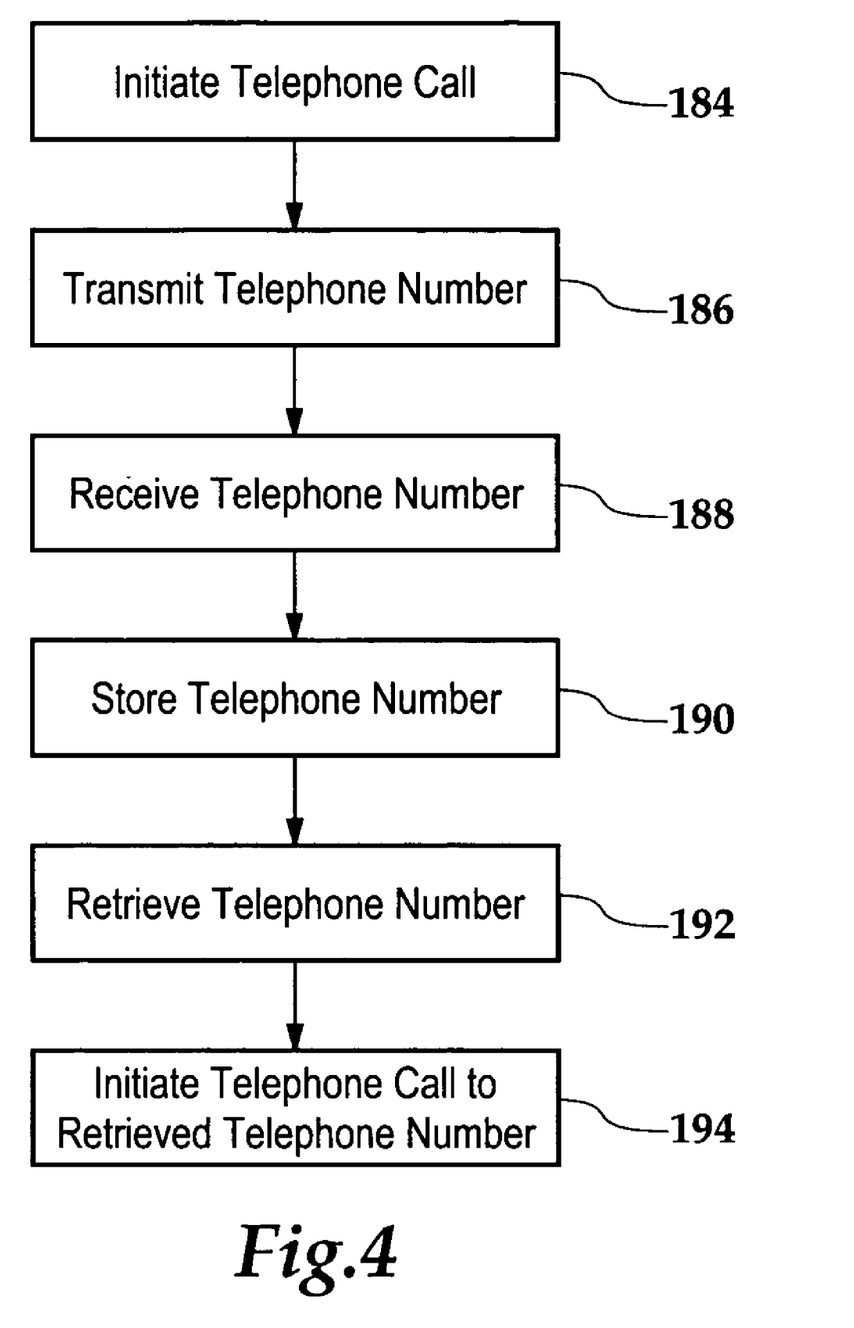
FIG. 4 is a flow chart depicting a method of data sharing and call initiation according to certain embodiments of the present invention.

A method of operation according to the present invention is depicted in flowchart form in FIG. 4. A telephone call is initiated from a first component, as represented by block 184. Depending on the circumstances, the first telephone component may be base unit 104, cordless handset 106, cordless handset 108, wired telephone 132 or some other component. In the process of making the telephone call, the telephone number to which the call is being placed is transmitted by the first component, as represented by block 186. This transmission may take place, for example, by means of Dual Tone Multi-Frequency (DTMF) tones or pulse sequences representing the digits of the number to which the call is being placed. The DTMF tones are transmitted over the PSTN line to the remote switch and may be captured by any telephone component attached to the same PSTN line. The number transmitted by the first component in block 186 is subsequently received by a second component in block 188, and stored within a second component, as represented by block 190. Depending on the circumstances, the second component may be base unit 104, cordless handset 106, cordless handset 108, wired telephone 132 or some other component.

Some time after the storage of the received telephone number within the second component in block 190, a redial function is requested by a user at the second component. Upon initiation of the redial function, the second component retrieves the stored telephone number in block 192 and initiates a telephone call to the retrieved telephone number in block 194.

Figure 5:
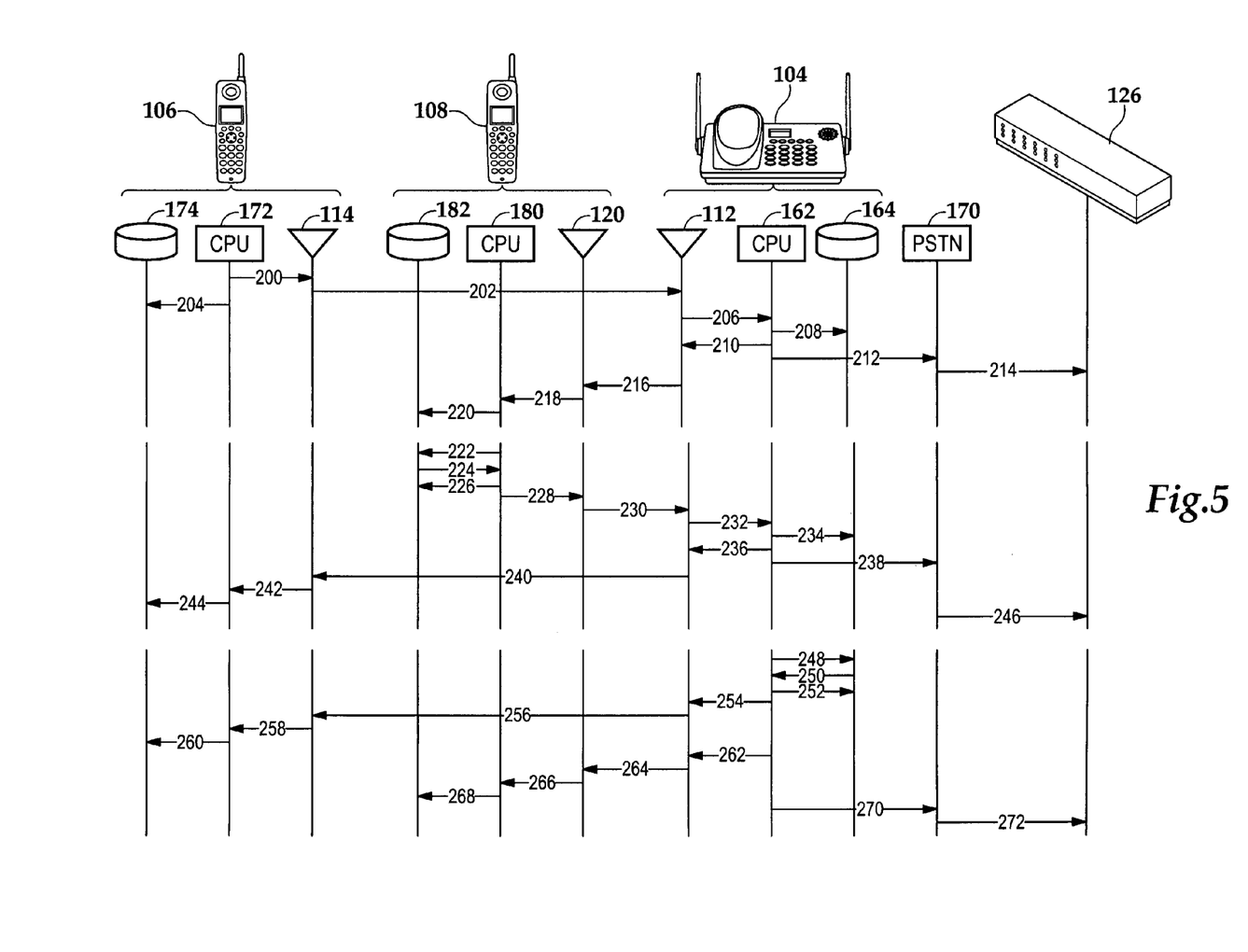
FIG. 5 is a message flow diagram depicting the flow of communications between the components of the system of FIG. 1.

FIG. 5 is a message flow diagram depicting the method of FIG. 4 according to various situations. Although the components shown in FIG. 5 include only the wireless components for simplicity, those of skill in the art will recognize that other components connected to the same telephone line may also transmit, receive, store and redial telephone numbers according to the present invention. Initially, handset CPU 172 of cordless telephone handset 106 transmits a message 200 containing a telephone number to handset antenna 114 for transmission to cordless telephone base unit 104 in the form of message 202. Handset CPU 172 subsequently sends a message 204 to handset memory 174 containing the telephone number for storage within handset memory 174. In addition to the telephone number, message 204 may include additional information, such as the current time and identifying information for the telephone number.

Upon receipt of message 200 from handset CPU 172, handset antenna 114 transmits message 202 across a wireless link to antenna 112 of cordless telephone base unit 104, which is forwarded to base unit CPU 162 in the form of message 206. This is necessary because all PSTN communications occur through the cordless telephone base unit 104. Upon receipt of message 206 from antenna 112, base unit CPU 162 sends a first message 208 to base unit memory 164 for storage, a second message 210 back to antenna 112 for transmission to cordless telephone handset 108 and a third message 212 to base unit PSTN interface 170 for transmission to PSTN switch 126, in order to initiate the telephone call via message 214.

Upon receipt of message 210 from base unit CPU 162, antenna 112 generates message 216 containing the dialed telephone number across a cordless link with cordless handset antenna 120. Handset antenna 120 then generates message 216 to handset CPU 180, which stores the received telephone number in handset memory 182 via message 220. As above, additional information may be stored in cordless handset memory 182 at the same time.

At a point in time subsequent to the generation of the messages described above, a user of the cordless telephone handset 108 selects the redial function. The telephone number to be redialed may be the last number dialed using system 100, or may be another number recently dialed. Whichever number is to be redialed, it will be one of the telephone numbers stored in handset memory 182. It may, for example, be the number stored in handset memory 182 in the form of message 220 above.

Upon receipt of the redial instruction, handset CPU 180 generates a message 222 to handset memory 182 requesting the selected telephone number to be redialed. Handset memory 182 sends the requested telephone number to handset CPU 180 in message 224. Handset CPU 180 generates a confirmation message 226 to handset memory 182 indicating that the retrieved telephone number is being redialed, and then generates a message 228 to handset antenna 120 for communication to cordless telephone base unit 104 containing the telephone number along with any other information necessary to initiate a telephone call.

Upon receipt of message 228 from handset CPU 180, handset antenna 120 generates a message 230 to cordless telephone base unit antenna 112 incorporating the telephone number to be dialed. Base unit antenna 112 then transmits message 232 to base unit CPU 162, which stores the telephone number in base unit memory 164 via message 234, repeats the telephone number to cordless telephone handset 106 in the form of message 236 to base unit antenna 112 and sends the telephone number to the PSTN switch 126 in the form of message 238.

Message 236 from base unit CPU 162 to base unit antenna 112 is repeated by base unit antenna 112 to first telephone cordless handset antenna 114 over a cordless link in the form of message 240. Message 240 is received by cordless telephone antenna 114 and communicated to cordless handset CPU 172 in the form of message 242, which stores the telephone number in cordless handset memory 174 via message 244. Message 238 from base unit CPU 162 to base unit PSTN interface 170, containing the telephone number to be dialed, is repeated to PSTN switch 126 in the form of message 246.

In addition to being dialed from the cordless telephone handset 106 and the cordless telephone handset 108 in the manner described above, a telephone call can be dialed from the cordless telephone base unit 104, and may be dialed using a redial function according to the present invention.

When a user selects the redial function at the cordless telephone base unit 104, the base unit CPU 162 initiates a query message 248 to base unit memory 164 requesting the telephone number to be redialed. As above, the number may be the immediate prior telephone number dialed using system 100, or may be another previously dialed telephone number, depending on the user's preference. Upon receipt of query message 248, base unit memory 164 retrieves the selected telephone number and sends it to the base unit CPU 162 in the form of reply message 250. Base unit CPU 162 subsequently sends confirmation message 252 to base unit memory 164 confirming that the retrieved number is being redialed.

In addition to storing the telephone number in its own memory 164, base unit 104 is also operable to transmit the telephone number to cordless handsets 106 and 108. Base unit CPU 162 first sends message 254 to antenna 112, which is repeated over a cordless link to cordless handset antenna 114 in the form of message 256. Cordless handset antenna 114 receives message 256 and forwards its contents in the form of message 258 to cordless handset CPU 172, which stores the information in cordless handset memory 174, as represented by message 260.

In a similar manner, base unit CPU 162 sends the outgoing call information to base unit antenna 112 as represented by message 262. The information is forwarded from base unit antenna 112 to cordless handset antenna 120 as represented by message 264, and from there to cordless handset CPU 180 as represented by message 266. Cordless handset CPU 180 then stores the information in cordless handset memory 182 as represented by message 268. Finally, message 270 from base unit CPU 162 to base unit PSTN interface 170, containing the telephone number to be dialed, is repeated to PSTN switch 126 in the form of message 272.

Figure 6:
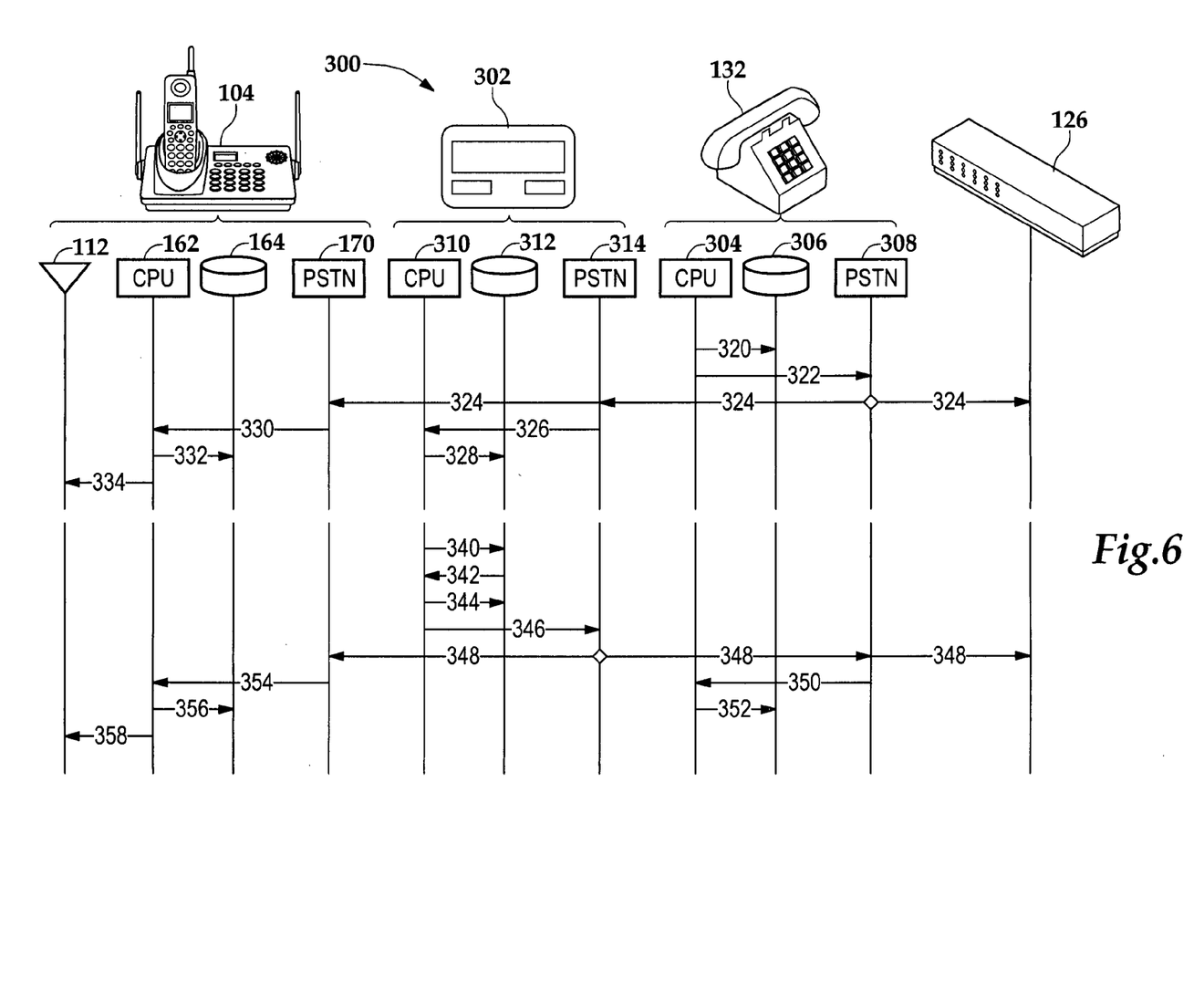
FIG. 6 is a message flow diagram depicting the flow of communications between the components of a telephone system according to certain embodiments of the present invention.

FIG. 6 is a message flow diagram depicting the method of FIG. 4 according to a separate embodiment. The telephone system 300 depicted in FIG. 6 includes wired telephone 132, cordless telephone base unit 104, and a stand-alone communication unit 302. Although the components shown in FIG. 6 include only a representative set of wired components, those of skill in the art will recognize that other components connected to the same telephone line may also transmit, receive, store and redial telephone numbers according to the present invention.

Wired telephone 132 includes a CPU 304, a memory unit 306 and a PSTN interface 308. Similarly, stand-alone communication unit 302 includes a CPU 310, a memory unit 312 and a PSTN interface 314. Upon dialing of a telephone number at wired telephone 132, wired telephone 132 stores the number in memory unit 306 in the form of message 320. At a later point in time, this information can be retrieved from memory unit 306 in order to perform an automatic redial from wired telephone 132. Subsequently, CPU 304 transmits a message 322 containing a telephone number to PSTN interface 308 for transmission over the local loop in the form of message 324, which is received by cordless base unit PSTN interface 170 and stand-alone communication unit PSTN interface 314, both of which are connected to the same local loop. Communication unit PSTN interface 314 receives the DTMF tones or pulses transmitted by PSTN interface 308, and forwards this information to communication unit CPU 310 in the form of message 326. Communication unit CPU 310 then stores this information in memory unit 312 in the form of message 328. The information stored in memory unit 312 via message 328 can later be retrieved in order to perform an automatic redial of the same number from communication unit 302.

At approximately the same time, base unit PSTN interface 170 receives the information sent across the local loop by PSTN interface 308 and communicates the information to base unit CPU 162 in the form of message 330. Base unit CPU 162 stores the message in memory unit 164 in the form of message 332, and forwards the same information to base unit antenna 112. The information stored in memory unit 164 via message 332 can later be retrieved in order to perform an automatic redial of the same number from base unit 104. The information is also transmitted to base unit antenna 112 in the form of message 334 in order that it may be communicated wirelessly as described above in connection with FIG. 5.

Subsequent to the telephone call initiated from wired telephone 132 and described above, stand-alone communication unit 302 is activated by a user. The redial functionality of stand-alone communication unit 302 is very similar to the redial functionality of wired telephone 132 and of base unit 104, except that the redial function is incorporated into a stand-alone unit rather than a telephone.

Upon activation of the redial function, communication unit CPU 310 initiates a query 340 to retrieve the last dialed number from memory unit 312. Memory unit 312 transmits the number back to CPU 310 in message 342. CPU 310 then sends a message 344 back to memory unit 312 to record the fact that the number in question is being redialed. In certain embodiments, message 344 may also include a time stamp indicating the date and time at which the number is being called. Finally, CPU 310 communicates message 346 to PSTN interface 314 in order to initiate the call.

Upon receipt of message 346 from CPU 310, PSTN interface 314 transmits the number to be dialed over the PSTN line 124 in the form of message 348. Depending on the specific application, the number may be dialed using a DTMF tone protocol or a pulse protocol. Although message 348 is primarily intended for switch 126, it will be received by all components connected to PSTN line 124. Accordingly, the information contained in message 348 will be received not only by switch 126, but also by base unit PSTN interface 170, wired telephone PSTN interface 308 and any other components connected to PSTN line 124.

Upon receipt of message 348 from redial unit PSTN interface 314 via PSTN line 124, wired telephone PSTN interface 308 will communicate its contents to wired telephone CPU 304 in the form of message 350. Wired telephone CPU 304 will then store the information in wired telephone memory unit 306 in the form of message 352. As described above, this information can be retrieved in order to redial the same number from wired telephone 132.

In a similar manner, base unit PSTN interface 170 will, upon receipt of message 348 on PSTN line 348, communicate its contents to base unit CPU 162 in the form of message 354. Base unit CPU 162 will then communicate the number to memory unit 164 in the form of message 356. As above, this information can later be retrieved in order to redial the number from base unit 104. Finally, base unit CPU 162 communicates the number to base unit antenna 112 for transmission to other components, as described above in connection with FIG. 5.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method of automatically redialing a telephone number comprising the steps of:
   initiating a telephone call to the telephone number using a first cordless telephone handset;
   communicating the telephone number from the first cordless telephone handset to a second cordless telephone handset;
   storing the telephone number within the second cordless telephone handset;
   retrieving the telephone number using the second cordless telephone handset; and
   automatically initiating a call to the retrieved telephone number using the second cordless telephone handset.

2. The method as recited in claim 1 wherein there is a cordless link between the first cordless telephone handset and the second cordless telephone handset.

3. The method as recited in claim 1 wherein the first cordless telephone handset and the second cordless telephone handset communicate with one another over a PSTN local loop.

4. The method as recited in claim 1 wherein at least two outgoing telephone numbers are stored within the second cordless telephone handset.

5. An apparatus for automatically redialing a telephone number comprising:
   a means for initiating a call to the telephone number using a first cordless telephone handset;
   a means for communicating the telephone number from the first cordless telephone handset to a second cordless telephone handset;
   a means for storing the telephone number within the second cordless telephone handset;
   a means for retrieving the telephone number using the second cordless telephone handset; and
   a means for automatically initiating a call to the retrieved telephone number using the second cordless telephone handset.

6. The apparatus as recited in claim 5 wherein there is a cordless link between the first cordless telephone handset and the second cordless telephone handset.

7. The apparatus as recited in claim 5 wherein the first cordless telephone handset and the second cordless telephone handset communicate with one another over a PSTN local loop.

8. The apparatus as recited in claim 5 wherein at least two outgoing telephone numbers are stored within the second cordless telephone handset.

9. A system for automatically redialing a telephone number comprising:
 a first cordless telephone handset incorporating a transceiver operable to initiate a call to the telephone number and operable to transmit the telephone number;
 a second cordless telephone handset incorporating a transceiver operable to initiate telephone calls and operable to receive the telephone number transmitted by the first cordless telephone handset;
 a memory unit, disposed within the second cordless telephone handset, operable to store the telephone number transmitted by the first cordless telephone handset; and
 a redial module, disposed within the second cordless telephone handset, operable to retrieve the telephone number from the memory unit and operable to automatically initiate a call to the retrieved telephone number.

10. The system as recited in claim 9 wherein there is a cordless link between the first cordless telephone handset and the second cordless telephone handset.

11. The system as recited in claim 9 wherein the first cordless telephone handset and the second cordless telephone handset communicate with one another over a PSTN local loop.

12. The system as recited in claim 9 wherein at least two outgoing telephone numbers are stored within the second cordless telephone handset.

13. A method of automatically redialing a telephone number comprising the steps of:
 initiating a telephone call to the telephone number using a first telephone component;
 communicating the telephone number from the first telephone component to a second telephone component;
 storing the telephone number within the second telephone component;
 retrieving the telephone number using the second telephone component; and
 automatically initiating a call to the retrieved telephone number using the second telephone component;
 wherein the first telephone component and second telephone component are operable to communicate with one another over a PSTN local loop.

14. An apparatus for automatically redialing a telephone number comprising:
 a means for initiating a call to the telephone number using a first telephone component;
 a means for communicating the telephone number from the first telephone component to a second telephone component;
 a means for receiving, at the second telephone component, the telephone number communicated from the first telephone component;
 a means for storing the telephone number within the second telephone component;
 a means for retrieving the telephone number using the second telephone component; and
 a means for automatically initiating a call to the retrieved telephone number using the second telephone component;
 wherein the first telephone component and second telephone component are operable to communicate with one another over a PSTN local loop.

15. A system for automatically redialing a telephone number comprising:
 a first telephone component incorporating an interface operable to initiate a call to the telephone number and to communicate the telephone number;
 a second telephone component incorporating an interface operable to initiate telephone calls and operable to receive the telephone number communicated by the first telephone component;
 a memory unit, disposed within the second telephone component, operable to store the telephone number communicated by the first telephone component; and
 a redial module, disposed within the second telephone component, operable to retrieve the telephone number from the memory unit and operable to automatically initiate a call to the retrieved telephone number;
 wherein the first telephone component and second telephone are operable to communicate with one another over a PSTN local loop.

* * * * *